(12) United States Patent
Sugimoto

(10) Patent No.: US 6,554,346 B2
(45) Date of Patent: Apr. 29, 2003

(54) APPARATUS FOR OPENING AND CLOSING WING DOOR OF TRUCK

(75) Inventor: Katsumi Sugimoto, Yokohama (JP)

(73) Assignee: Seiko Giken Kabushiki Kaisha, Tokyo (JP)

(*) Notice: Subject to any disclaimer, the term of this patent is extended or adjusted under 35 U.S.C. 154(b) by 0 days.

(21) Appl. No.: 10/176,021

(22) Filed: Jun. 20, 2002

(65) Prior Publication Data

US 2002/0158488 A1 Oct. 31, 2002

Related U.S. Application Data

(63) Continuation of application No. PCT/JP01/09319, filed on Oct. 24, 2001.

(30) Foreign Application Priority Data

Oct. 25, 2000 (JP) ........................................ 2000-324867

(51) Int. Cl.⁷ ............................................... B60R 27/00
(52) U.S. Cl. ...................... 296/147; 296/183; 49/345; 49/346
(58) Field of Search ................................ 296/183, 147, 296/155, 146.8, 146.1; 49/324, 339, 344, 345, 346

(56) References Cited

U.S. PATENT DOCUMENTS 5,992,918 A * 11/1999 Gobart et al. ............... 296/155
6,247,747 B1 * 6/2001 Kawanomoto et al. . 296/183 X

FOREIGN PATENT DOCUMENTS

| JP | 1-111520 | * 4/1989 |
| JP | 08-067148 | 3/1996 |
| JP | 08-332849 | 12/1996 |
| JP | 2000-006664 | 1/2000 |
| JP | 2000-006665 | 1/2000 |
| JP | 2000-052776 | 2/2000 |
| JP | 2001-206066 | * 7/2001 |
| JP | 2002-115450 | * 4/2002 |

* cited by examiner

Primary Examiner—Joseph D. Pape
(74) Attorney, Agent, or Firm—Welsh & Katz, Ltd.

(57) ABSTRACT

An apparatus for opening and closing a wing door 1 of a truck, which is hinged to a vehicle body of a truck is accommodated in a space defined by a frame 2 when the wing door 1 is closed. The apparatus comprises a first arm 4 pivotally mounted on the vehicle body so as to pivotally move in association with the opening and closing of the wing door; a second arm 6 swingably linked between one end of the first arm 4 and the wing door 1; a spring 16 having one end supported relative to the vehicle body for generating a biasing force to lift up the wing door 1; a spring rod 11 connected to the other end of the spring 16 so as to move in association with the extension and retraction of the spring 16; a third arm 9 swingably linked between the other end of the first arm 4 and the spring rod 11; and a guide 13 for guiding the spring rod 11 or a link point 10 between the third arm 9 and the spring rod 11 for moving the spring rod in a direction substantially parallel with the axis of the spring 16.

4 Claims, 7 Drawing Sheets

US 6,554,346 B2

APPARATUS FOR OPENING AND CLOSING WING DOOR OF TRUCK

This application is a continuation of PCT/JP01/09319 filed Sep. 24, 2001.

BACKGROUND OF THE INVENTION

The present invention relates to an apparatus for opening and closing a wing door and, in particular to an apparatus for opening and closing a wing door of an truck.

Hydraulic actuators or electric motor have heretofore been used as drive power sources for opening and closing a wing door.

If the hydraulic actuators or electric motors are used as a drive power source for opening and closing a wing door, piping, wiring and/or power supplies for driving the hydraulic actuators or electric motors are necessary.

Problems occur that the apparatus for opening and closing the wing door is increased in its scale, that cost and labor are required for its maintenance and that repair is cumbersome if the drive apparatus malfunctions.

It is an object of the present invention to provide an apparatus for opening and closing a wing door, which is simple in structure comprising a spring and a link mechanism, and is almost free of maintenance. It is another object of the present invention to provide an apparatus for opening and closing a wing door in which a force is uniformly applied upon a "spring" which is a drive power source for opening and closing a wing door, in which no excessive force is applied to a "spring rod" which is connected to the "spring", and which is excellent in reliability and durability.

BRIEF DESCRIPTION OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
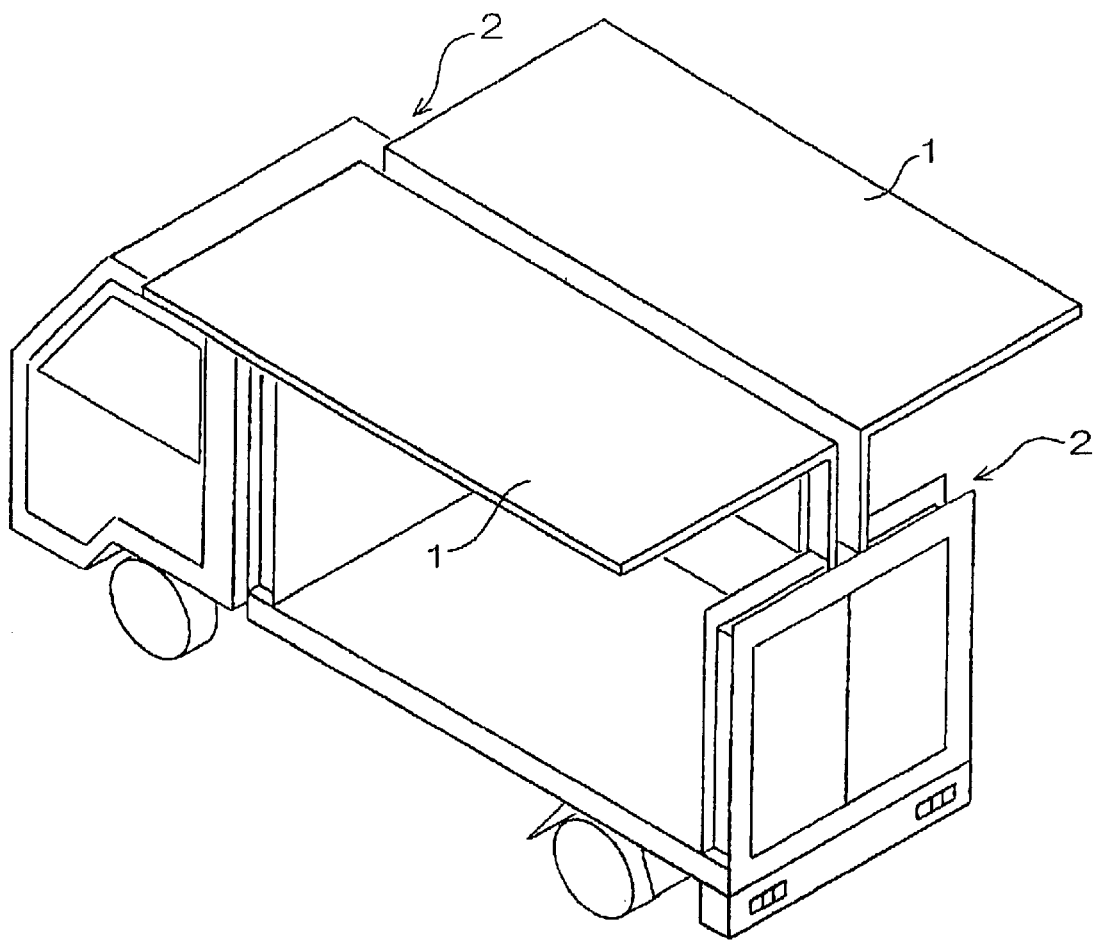
FIG. 1 is a view showing the appearance of a truck to which the wing door closing and opening apparatus is applied.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United State Patent Office, and does not imply, nor should be inferred to limit the subject matter disclosed herein.

All patents referred to herein, are hereby incorporated herein by reference, whether or not specifically do so within the text of this disclosure.

In the present disclosure, the words "a" or "an" are to be taken to include both the singular and the plural. Conversely, any reference to plural items shall, where appropriate, include the singular.

The present inventors have made efforts on research to accomplish the above-mentioned object and have found that it is necessary to configure the apparatus (spring and link system) in such a manner that a force is uniformly applied upon the spring and no excessive force is applied upon the spring rod when the wing door is opened or closed if the "spring" is used as a drive power source for opening and closing the wing door. Accordingly, the present inventors have made an invention as a result of this finding.

The present invention provides an apparatus for opening and closing a wing door, characterized in that the apparatus comprises: a first arm which is pivotally mounted on the vehicle body as to pivotally move in association with the opening and closing of the wing door; a second arm which is swingably linked between one end of the first arm and the wing door; a spring having one end which is supported relative to the vehicle body for generating a biasing force to lift up the wing door; a spring rod which is connected to the other end of the spring so as to move in association with the extension and retraction of the spring; a third arm which is swingably linked between the other end of the first arm and the spring rod; and a guide to guide the spring rod or a link point between the spring rod and the third arm for moving the spring rod in a direction which is substantially parallel with an axis of the spring.

The apparatus for opening and closing a wing door comprises a spring serving as a drive power source for opening and closing the wing door; and a spring rod and first to third arms. The spring rod and arms serve as a link mechanism for transmitting a biasing force from the spring to the wing door. Therefore, the wing door opening and closing apparatus is so simple in structure, so that its maintenance is very simple.

Figure 7:
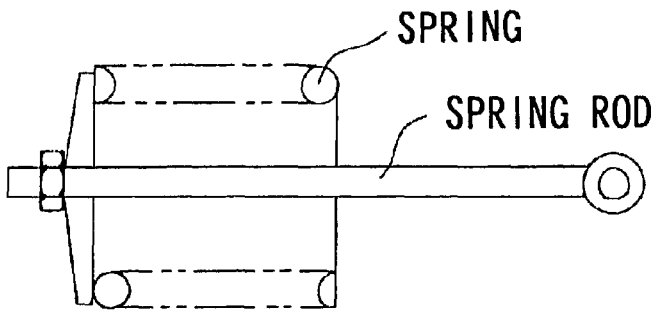
FIG. 7(A) is a view explaining the principle of the present invention in which the spring rod is moved in a direction parallel with the axis of the spring which is in an initial state.
FIG. 7(B) is a view explaining the principle of the present invention in which the spring rod is moved in a direction parallel with the axis of the spring which is in an extended state.
Figure 7:
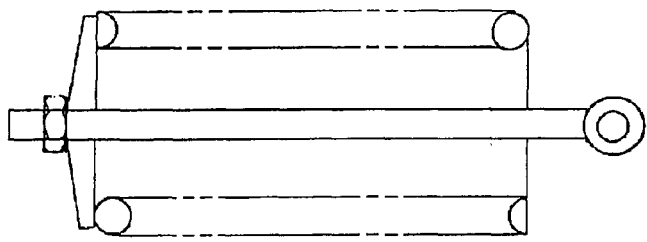

The guide which guides the spring rod or a link point between the spring rod and the third arm (the guide for guiding a pin linked collapsible rod) causes the spring rod to move in a direction which is substantially parallel with the axis of the spring as shown in FIG. 7(A) (initial state) to FIG. 7(B) (extended state), so that (1) the spring is extended in a linear or straight manner. A force is uniformly applied to the spring over the entire periphery thereof (the spring is used in an ideal condition). This enhances the durability and reliability of the spring. (2) Since only a pulling force is applied to the spring rod, the spring rod is also used in an ideal condition. In accordance with the present invention, the durability and reliability as a whole of the wing door closing and opening apparatus is also enhanced.

Figure 8:
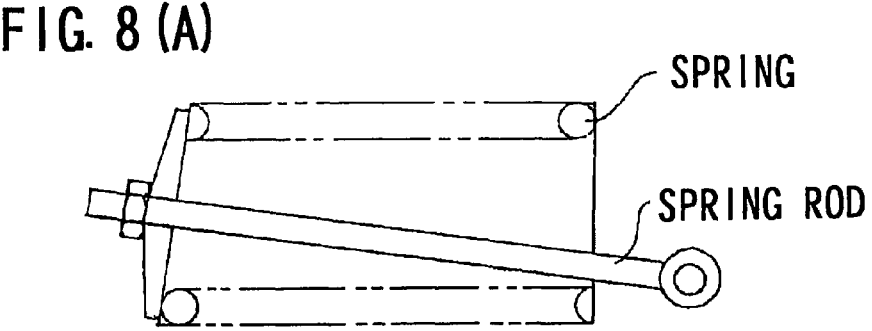
FIG. 8(A) is an explanatory view explaining a problem of a comparative case where the spring rod is not moved in a direction parallel with the axis of the spring.
FIG. 8(B) is an explanatory view explaining a problem of a comparative case where a nut which is threadably engaged with the other end of the spring rod is separated from a spring seat.
Figure 8:
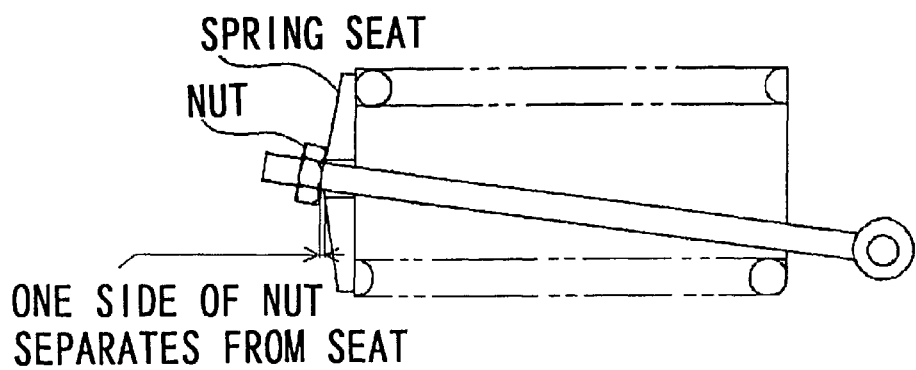

Since the force which is applied upon the spring is tiltedly biased to one side thereof if the spring rod is inclined relative to the spring axis as shown in FIGS. 8(A) and 8(B), the force which is applied to the spring is not uniform and the spring force is not constant. Since a bending force is applied to the spring rod in addition to the pulling force (in particular, in case of FIG. 8(B)), an excessive force is applied upon the spring and spring rod. Therefore, durability and reliability of the spring and spring rod is remarkably lowered.

Advantages of the inventive wing door opening and closing apparatus include, for example, the following:

1. Since the number of the links and joints is small and the "spring" is used as a drive power source, the apparatus is simple in structure as a whole.
2. Maintenance of the apparatus is almost unnecessary since the spring is used as the drive power source.
3. Since the spring and the spring rod are actuated in an ideal condition due to the fact that the direction of the movement of the spring rod is kept as constant as possible, the durability and reliability of the spring and the spring rod, in turn the whole of the apparatus is high.
4. It is possible to lift up the wing door to its maximum opening by a simple structure comprising only the spring and link mechanism.
5. Since the wing door opening and closing apparatus has a high design freedom degree concerning the selection of springs, it may be applied to various wings having various weights and sizes.

In a preferred mode of embodying the present invention, the guide comprises a guide member (for example, a member having a guide face or guide rail) which is secured to the vehicle body and extends in a direction which is substantially parallel with the direction of an axis of the spring. A first roller which slides along the guide member when the wing door is opened and closed is mounted on a link point between the third arm and the spring rod. Thus, the spring rod is prevented from swinging by the fact that the guide member supports the first roller while the guide member is in a slide contact with the first roller when the wing door is opened and closed.

In a preferred mode embodying the invention, the guide is a second roller which is pivotally mounted on the vehicle body and the second roller supports the spring rod while it is in a slide contact with the spring rod for preventing the spring rod from swinging when the wing door is opened or closed.

In a preferred mode embodying the invention, the apparatus comprises a stop which is disposed in a space defined by the frame and is fixed to the vehicle body which abuts on the first arm or second arm in a predetermined rotational position when the wing door is opened.

The wing door opening and closing apparatus of the present invention is preferably adopted as an apparatus for opening and closing a wing door which covers at least part of the side and at least part of the roof of a truck, and can be preferably also used as an apparatus for opening and closing a wing door which is mounted on vehicles other than truck if necessary.

In case where the wing door opening and closing apparatus is applied to vehicles such as trucks having cargo box, the wing door opening and closing apparatus can be accommodated within a space defined by a frame which is fixed to or integral with a vehicle body.

Embodiments of the present invention will now be described with reference to the drawings for making the above-mentioned modes embodying the invention more clear.

A truck including a wing door to which an apparatus for opening and closing the wing door of the present invention is preferably applied will be described.

FIG. 1 is a view showing a truck (wing door vehicle) to which the wing door opening and closing apparatus of the present invention is applied. Referring now to FIG. 1, the truck comprises wing doors 1, 1 which are pivotally mounted on a vehicle body and frames of cargo boxes 2, 2 which are provided at the front and rear of the vehicle body. The wing door opening and closing apparatus are provided on both (left and right) sides of the cargo boxes and at front and rear ends of the cargo box within each of the frames 2, 2. Since the four wing door opening and closing apparatus are equivalent to each other, a detailed description of one of the wing door opening and closing apparatus will be described hereinafter. In total two wing door opening and closing apparatus, one for each of the wing doors, may be provided if the wing doors 1, 1 have enough rigidity.

Figure 2:
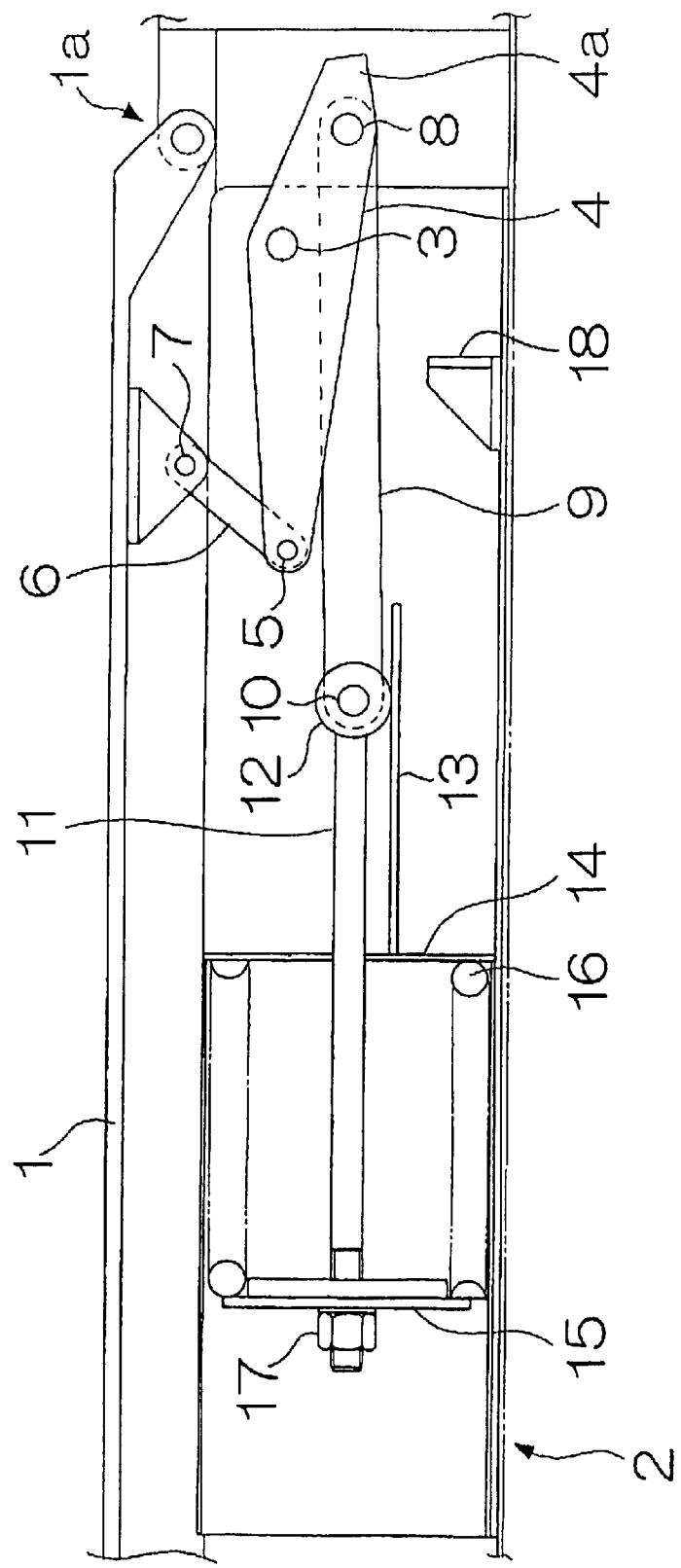
FIG. 2 is a view explaining the wing door opening and closing apparatus of a first embodiment of the present invention.

A wing door opening and closing apparatus of the first embodiment of the present invention will be described. FIG. 2 is a front view explaining the structure of the wing door opening and closing apparatus of the first embodiment of the invention which is used for the truck illustrated in FIG. 1. That is, FIG. 2 is a view showing the front of the wing door opening and closing apparatus in which one of the side walls of the frame 2 is omitted. FIGS. 3 to 6 are views which are similar to FIG. 1.

Now, operation of the wing opening and closing apparatus will be described. FIG. 2 is a view explaining the operation of the wing door opening and closing apparatus.

Referring now to FIG. 2, the wing door 1 is pivotally mounted on a vehicle body in the vicinity of the center thereof via a hinge 1a. A first arm 4 is pivotally mounted on a frame 2 via a pin 3 on one of the inner sides of the frame 2 which is secured to or integral with the vehicle body. The first arm 4 is linked to one end of a second arm 6 via a pin 5. The second arm 6 is pivotally mounted at the other end on the inner side of the wing door 1 via a pin 7. This causes the second arm 6 to be pivotally linked to one side (end) of the first arm 4 with respect to the pivot point (pin 3) and to the wing door 1.

On the other hand, a spring (compression spring) 16 is accommodated or provided within the frame 2 on the other side thereof so that the axis of the spring extends in a horizontal direction. The spring 16 is supported on one side thereof by one 14 of spring seats (retainers) which is fixed on the vehicle body. The spring 16 is in an abutting relationship with the other spring seat 15, and is supported thereon as shown. A spring rod 11 extends through both spring seats 14, 15 and a space defined by the frame in a horizontal direction which is parallel with the axis of the spring 16.

A nut 17 is threadably engaged with the other end of the spring rod 11. The nut 17 is in an abut relationship with the other side 15 of the spring seats. This causes the spring rod 11 to be connected to the other side of the spring 16, so that the spring rod 11 is movable in association with the extension and retraction of the spring 16. The initial compression amount (compression amount when the wing door is closed) can be adjusted by threadably adjusting the position of the nut 17 on the spring rod 11.

The first arm 4 is linked at the other end thereof with respect to the pivot point (pin 3) to one end of a third arm 9 via a pin 8. The third arm 9 is linked at the other end to one end of the spring rod 11. The third arm 9 is linked between the other end of the first arm 4 relative to the pivot point (pin 3) and the spring rod 11.

A first roller 12 is mounted on the pin 10 which is a link point between the spring rod 11 and third arm 9 which form a collapsible rod. A guide 13 (first guide) which is fixed on the vehicle body and includes a slide face (guide face) extending in a horizontal direction, that is the direction of the axis of the spring 16 is provided within a space defined by the frame 2. The guide 13 is adapted to guide the first roller 12, ultimately pin 10 so that the spring rod 11 is moved in a direction substantially parallel with the axis of the spring 16, that is, moved (translated) in parallel with the axis of spring 16 when the wing door is opened or closed.

A stop 18 which is fixed on the vehicle body is provided on the bottom of the space defined by the frame 2. When the wing door 1 is opened, the stop 18 will abut to an abutment portion 4a which is provided in the vicinity of the pin 8 of the first arm 4 for preventing the wing door 1 from further swinging to define a maximum opening degree (angle) of the wing door 1.

Figure 3:
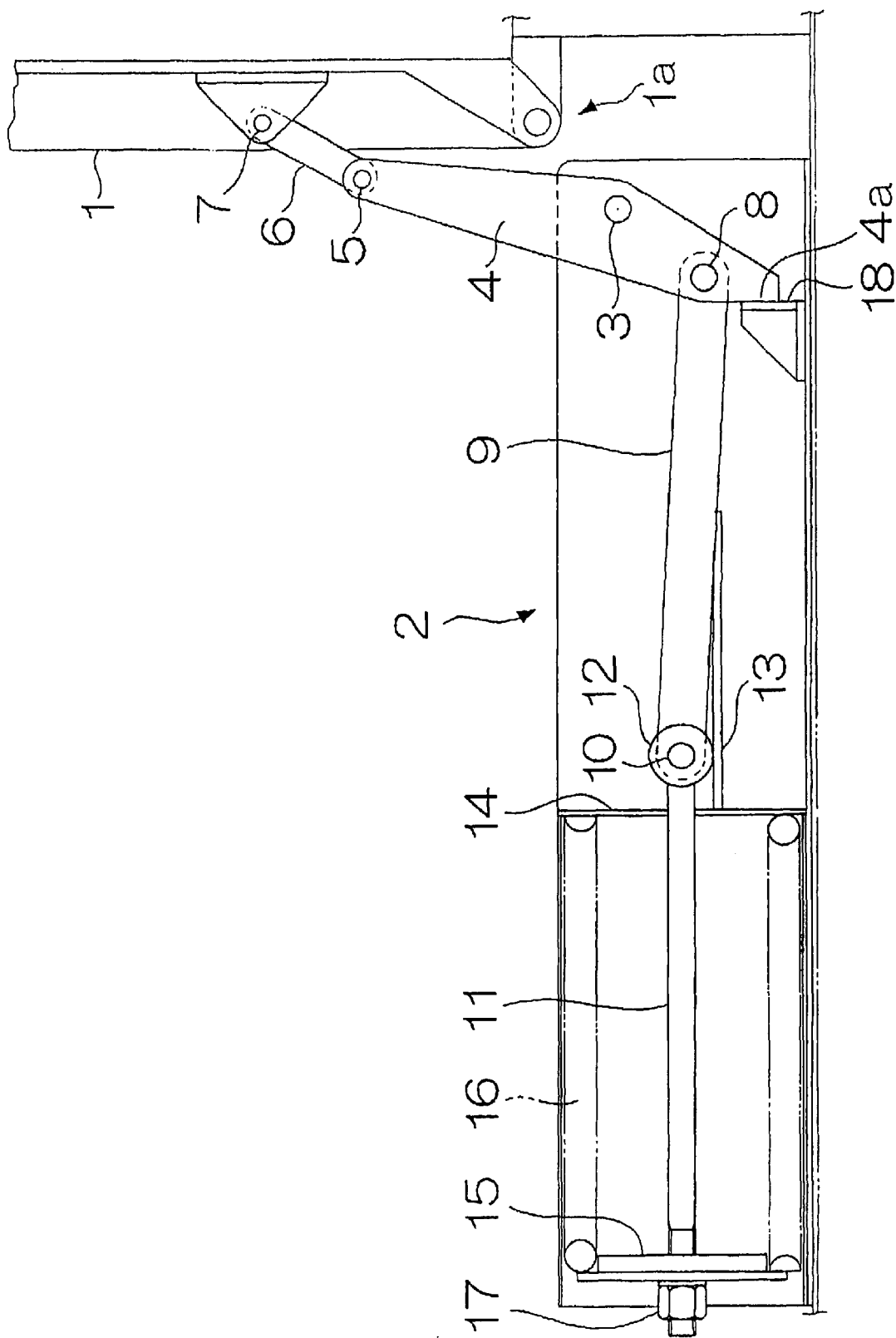
FIG. 3 is a view explaining the operation of the wing door opening and closing apparatus which is shown in FIG. 2.

Subsequently, the operation of the wing door opening and closing apparatus which has been described will be described. FIG. 3 is a view explaining the operation of the wing door opening and closing apparatus which is illustrated in FIG. 2.

Referring now to FIGS. 2 and 3, when an operator unlocks the wing door 1, the spring 16 is extended so that the spring rod 11 and the third arm 3 are pulled in a leftward direction as viewed in FIG. 2. This causes the first arm 4 to be pivoted in a clockwise direction as viewed in FIG. 2. This causes the second arm 6 to be lifted upward, so that the wing door 1 is swung in an opening direction. At this time the wing door 1 is swung (turned) in a clockwise direction as viewed in FIG. 2 in association with the pivotal movement of the first arm 4. This causes the pin 10 to receive a force which acts upon the pin 10 in a downward direction as viewed in FIG. 2. However, the first roller 12 is supported by the guide 13 to prevent the roller 12 from moving in a downward direction due to the fact that the first roller 12 is in a slide contact with the guide 13. Accordingly, the spring rod 11 is normally moved in a horizontal direction, that is in a direction which is substantially parallel with the axis of the spring 16. As a result, when the wing door is opened or closed, the spring 16 is prevented from being tilted, and an excessively large force is prevented from being applied upon the spring rod 11.

When the wing door 1 is further swung, the abutment part 4a will abut upon the stopper 18 to prevent the first arm 4 from further rotating in a clockwise direction as viewed in FIG. 2. Thus, the maximum opening degree of the wing door 1 is determined. The maximum opening degree of the wing door can be adjusted by changing the position of the stopper 18 or the abutment part 4a.

When the wing door which has been opened is closed, it can be swung in a closing direction against the biasing force of the spring 16 by pulling a cord or the like which is fastened to the wing door 1. Also at this time of closing the wing door, the spring rod 11 is guided by the guide 13 so that it is moved in parallel with the horizontal direction (in a direction which is substantially parallel with the spring axis).

Guides 13 (a pair of guides) may be provided in a spaced manner in a vertical direction in such a manner that the first roller 12 is disposed therebetween if needed.

Figure 4:
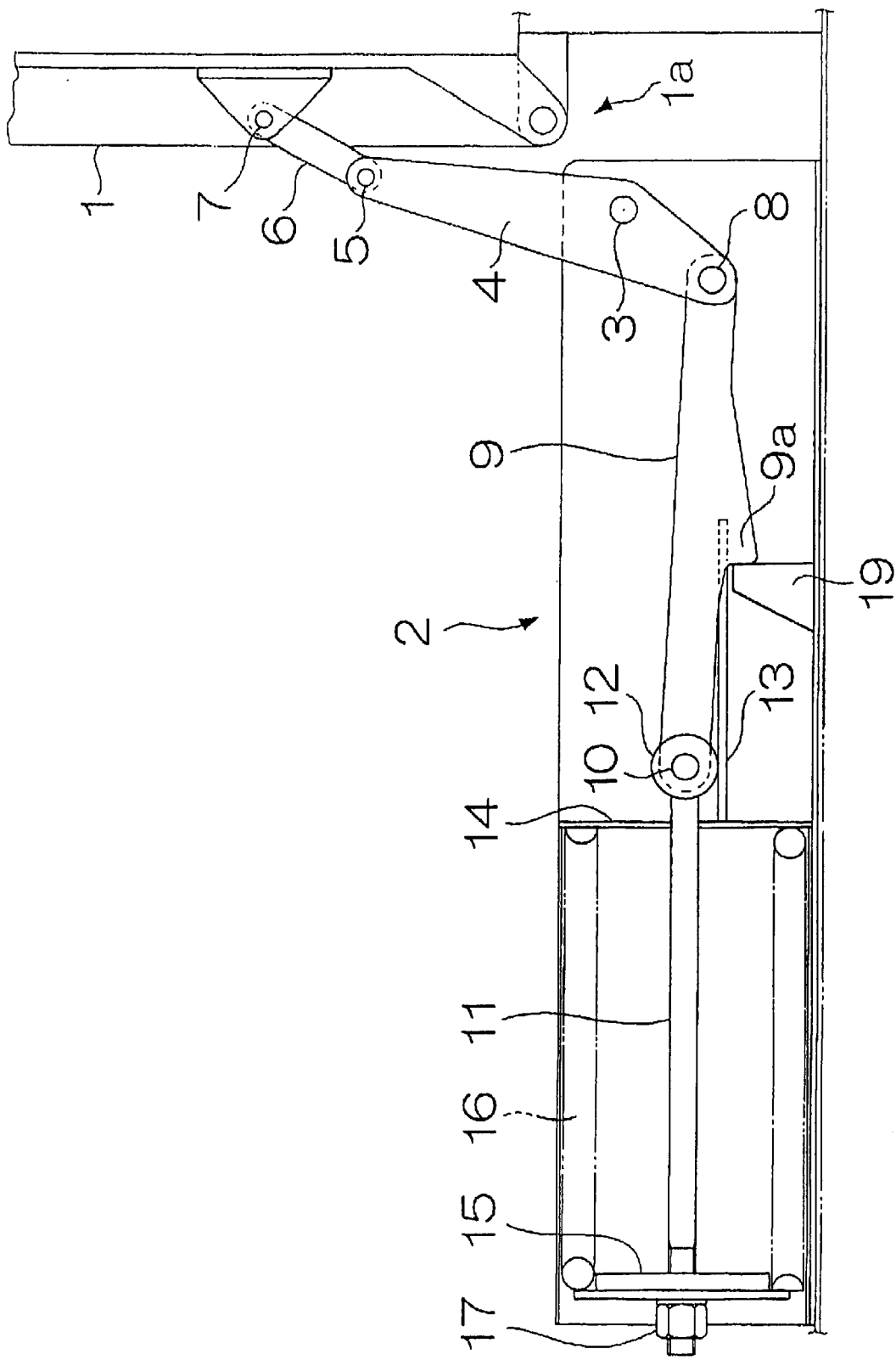
FIG. 4 is a view explaining the wing door opening and closing apparatus of a second embodiment of the present invention.

A wing door opening and closing apparatus of a second embodiment of the present invention will be described. In order to avoid duplication of the description of the features of the second embodiment which are identical with those of the first embodiment, it will be incorporated by reference in the following description and the difference between the first and second embodiments will be mainly described. FIG. 4 is a front view explaining the structure of the wing door opening and closing apparatus of the second embodiment of the present invention which is embodied to the truck which is shown in FIG. 1.

Referring now to FIG. 4, in the wing door opening and closing apparatus of the second embodiment, the first arm 4 is not provided with the abutment part unlike the first embodiment, and instead the third arm 9 is provided with an abutment protrusion 9a which of abutting upon the stop 19. That is, the third arm 9 is formed at the lower part thereof with the abutment protrusion 9a which projects downward. When the wing door 1 is opened, further pivotal movement or swinging of the first arm 4 in an opening direction is prevented due to the fact that the abutment 9a abuts upon the stop 19. Thus, the maximum opening degree of the wing door 1 is determined.

Figure 5:
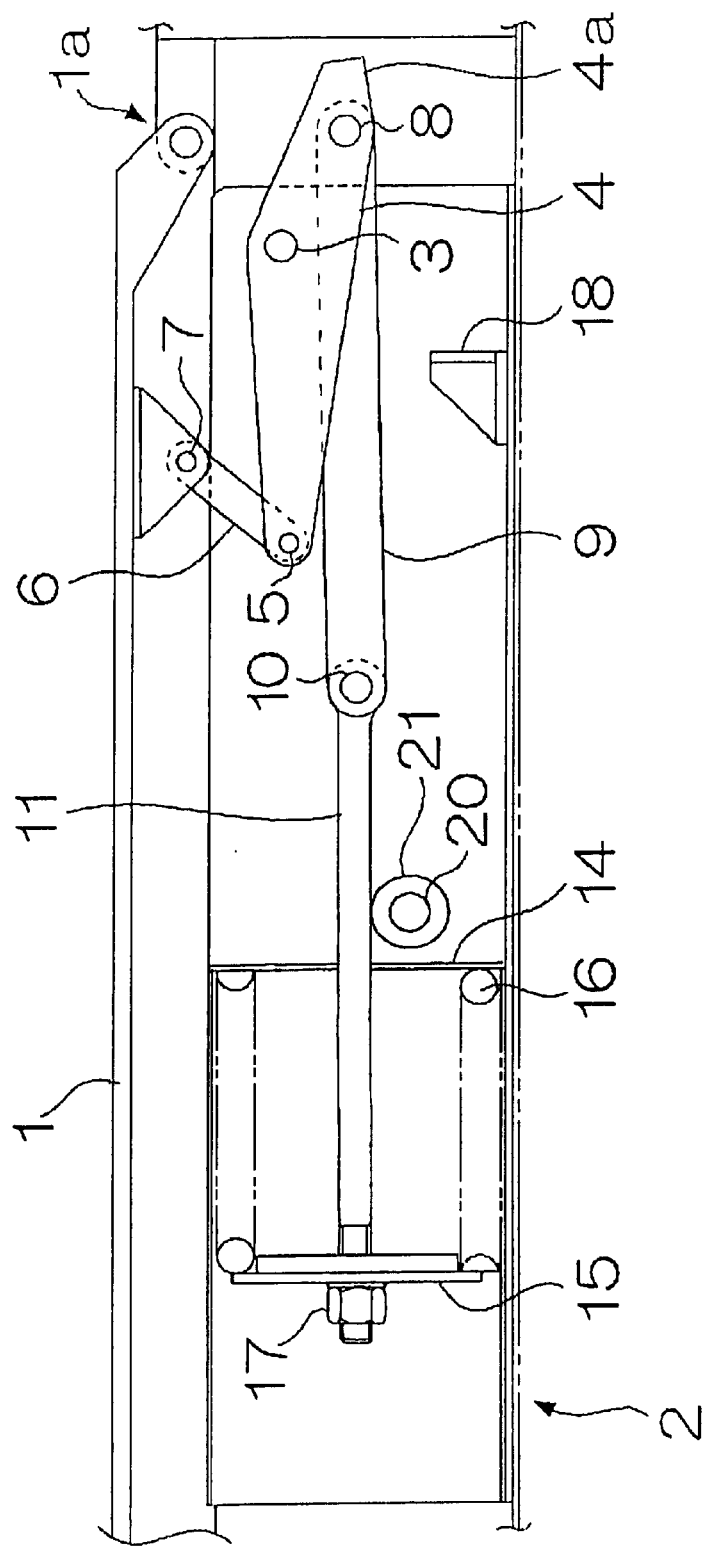
FIG. 5 is a view explaining the wing door opening and closing apparatus of a third embodiment of the present invention.

A wing door opening and closing apparatus of a third embodiment of the present invention will be described. In order to avoid duplication of the description of the features of the second embodiment which are identical with those of the first embodiment, it will be incorporated by reference in the following description and the difference between the first and second embodiments will be mainly described. FIG. 5 is a front view explaining the structure of the wing door opening and closing apparatus of the third embodiment of the present invention which is embodied to the truck which is shown in FIG. 1.

Figure 6:
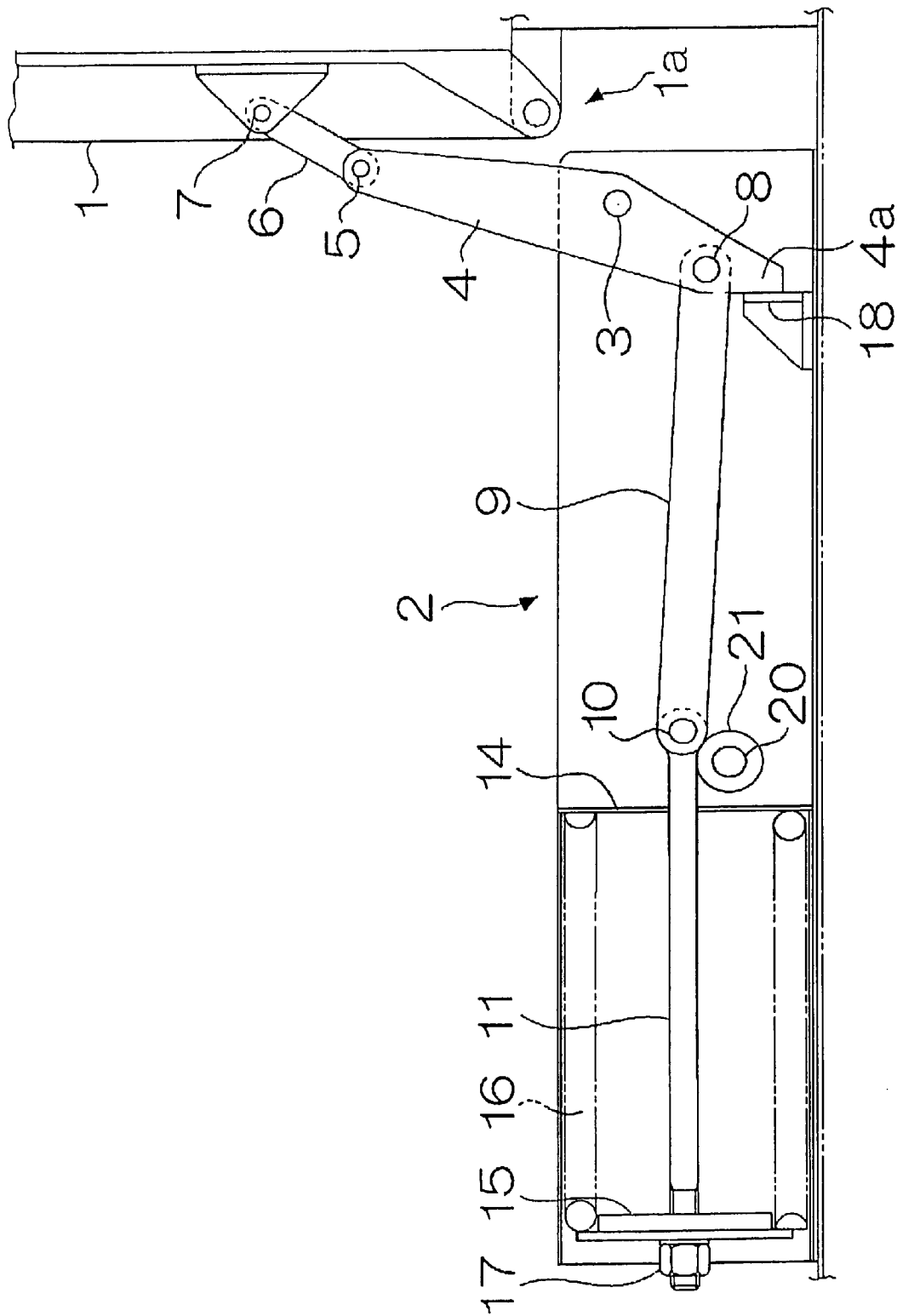
FIG. 6 is a view explaining the operation of the wing door opening and closing apparatus which is shown in FIG. 5.

FIG. 6 is a view explaining the operation of the wing door opening and closing apparatus which is shown in FIG. 5.

Referring now to FIGS. 5 and 6, in the wing door opening and closing apparatus of the third embodiment, a second roller 21 (second guide) which directly guides or supports the spring rod 11 is provided, instead of the case of the first embodiment where the guide having a guide face extending in a horizontal direction and the first roller which is disposed on the pin which links the spring rod 11 with the third arm 9 are provided. That is, the second roller 21 is provided on a pivot 20 which is fixed to or integral with the frame 2. The second roller 21 supports the spring rod 11 while it is in a slide contact with the spring rod 11 to prevent the spring rod 11 from swinging, in other words to cause the spring rod 11 to move in a direction of the direction which is parallel with the axis of the spring 16 (horizontal direction) when the wing door 1 is opened or closed. This causes the second roller 21 (guide) to prevent the spring 16 from being tilted, or flexed and to guide the spring rod 11 so that the spring rod 11 is moved in a substantially horizontal direction.

If needed, second rollers 21 (a pair of rollers) may be provided in a vertical relationship so that the spring rod 11 is disposed therebetween.

In accordance with the present invention, there is provided the wing door opening and closing apparatus using a spring and a link mechanism, which is of simple structure and hardly requires maintenance, and the wing door opening and closing apparatus which is configured to apply a uniform force upon a "spring" which is a drive power source for opening and closing the wing door, and is excellent in reliability and durability.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

The following is a description of the reference numerals used in this application.

1 wing door
1a hinge
2 frame
3 pin (pivot shaft of a first arm, first pivot point)
4 first arm
4a abutment part
5 pin (link shaft between the first and second arms)
6 second arm
7 pin (link shaft between second arm and a wing door)
8 pin (link shaft between the first and third arm)
9 third arm
9a abutment part
10 pin (link shaft between the third arm and a spring rod)
11 spring rod
12 first roller
13 guide (first guide)
14 one of spring seats
15 the other of spring seats
16 spring
17 nut (spring adjusting nut)
18 stop
19 stop
20 pivot
21 second roller (second guide)

What is claimed is:

1. An apparatus for opening and closing a wing door which is hinged to a vehicle body of a motor vehicle, the vehicle body having a frame, said apparatus being accommodated in a space defined by the frame when the wing door is closed, characterized in that said apparatus comprises
   a first arm which is pivotally mounted on the vehicle body so as to pivotally move in association with the opening and closing of the wing door;
   a second arm which is swingably linked between one end of said first arm and the wing door;
   a spring having one end which is supported relative to the vehicle body for generating a biasing force to lift up the wing door;
   a spring rod which is connected to the other end of said spring so as to move in association with the extension and retraction of said spring;
   a third arm which is swingably linked between the other end of said first arm and said spring rod; and
   a guide to guide said spring rod or a link point between said spring rod and said third arm for moving said spring rod in a direction which is substantially parallel with an axis of said spring.

2. An apparatus for opening and closing a wing door as defined in claim 1 characterized
   in that said guide is a member which is stationary with respect to the vehicle body and which extends in a direction which is substantially parallel with the axis of said spring,
   in that a first roller is mounted on a link point between said third arm and said spring rod so as to slide over said guide member when the wing door is opened or closed, and
   in that said first roller is in rolling contact with said guide member to prevent said spring rod from swinging.

3. An apparatus for opening and closing a wing door as defined in claim 1 characterized
   in that said guide is a roller which is pivotally mounted on the vehicle body, and
   in that said roller supports and is in rolling contact with said spring rod to prevent said spring rod from swinging when the wing door is opened or closed.

4. An apparatus for opening and closing a wing door as defined in claim 1 characterized in that said apparatus comprises a stop which is disposed in a space defined by said frame and is fixed to said vehicle body which abuts on said first arm or third arm at a predetermined rotational position to determine a maximum opening degree of said wing door when said wing door is opened.

* * * * *